(12) United States Patent
Maes

(10) Patent No.: US 7,003,497 B2
(45) Date of Patent: Feb. 21, 2006

(54) SYSTEM AND METHOD FOR CONFIRMING ELECTRONIC TRANSACTIONS

(75) Inventor: Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/038,987

(22) Filed: Dec. 31, 2001

(65) Prior Publication Data

US 2002/0178122 A1   Nov. 28, 2002

Related U.S. Application Data

(60) Provisional application No. 60/293,038, filed on May 23, 2001.

(51) Int. Cl.
*G06F 17/60*   (2006.01)

(52) U.S. Cl. ............................. 705/64; 705/74; 705/75; 713/150; 713/200; 713/201; 709/203; 709/206; 709/207

(58) Field of Classification Search ............ 705/50–80; 713/150, 200, 201; 709/203, 206, 207
See application file for complete search history.

(56) References Cited

U.S. PATENT DOCUMENTS

| | | | |
|---|---|---|---|
| 5,136,643 A | 8/1992 | Fischer | 380/23 |
| 5,897,616 A | 4/1999 | Kanevsky et al. | 704/246 |
| 5,903,878 A * | 5/1999 | Talati et al. | 705/26 |
| 6,016,476 A | 1/2000 | Maes et al. | 705/1 |
| 6,039,248 A | 3/2000 | Park et al. | 235/379 |
| 2001/0029496 A1 * | 10/2001 | Otto et al. | 705/74 |
| 2001/0037464 A1 * | 11/2001 | Persels et al. | 713/201 |
| 2001/0042050 A1 * | 11/2001 | Fletcher et al. | 705/64 |
| 2002/0032668 A1 * | 3/2002 | Kohler et al. | 705/401 |
| 2003/0018572 A1 * | 1/2003 | Beschle et al. | 705/37 |
| 2003/0069857 A1 * | 4/2003 | Junda | 705/74 |
| 2004/0002903 A1 * | 1/2004 | Stolfo et al. | 705/26 |
| 2004/0260653 A1 * | 12/2004 | Tsuei et al. | 705/54 |

FOREIGN PATENT DOCUMENTS

EP   1085436 A2 *   3/2001

OTHER PUBLICATIONS

U.S. Appl. No. 09/471,744.*
Dialog File 16, Accession No. 03198559☐☐"Beyond Announces Most Advanced Remote E-Mail Solution", PR Newswire, Jan. 24, 1994.*
U.S. Appl. No. 09/417,645, filed Oct. 14, 1999 entitled System and Method for Providing Secure Financial Transactions.

* cited by examiner

Primary Examiner—James P. Trammell
Assistant Examiner—Jalatee Worjloh
(74) Attorney, Agent, or Firm—Frank V. DeRosa; F.Chau & Associates,LLC

(57) ABSTRACT

Systems and methods for providing user-confirmation of an electronic transaction and in particular, protocols for enabling electronic signatures and confirmation of electronic documents and transactions such as electronic financial transactions and credit card payment. In one aspect, a method for confirming an electronic transaction, comprises the steps of: performing an electronic transaction between a first party and a second party; sending, by the second party, a request for confirmation of the electronic transaction to a predetermined, private mailbox associated with the first party; accessing the private mailbox by the first party; and sending, by the first party, a reply message to the request for confirmation to thereby confirm authorization of the electronic transaction.

27 Claims, 3 Drawing Sheets

SYSTEM AND METHOD FOR CONFIRMING ELECTRONIC TRANSACTIONS

CROSS REFERENCE TO RELATED APPLICATION

This application is based on U.S. Provisional Application No. 60/293,038, filed on May 23, 2001, which is incorporated herein by reference.

TECHNICAL FIELD OF THE INVENTION

The present invention relates generally to systems and methods for confirming electronic transactions and, more particularly, systems and methods for providing user authorization of electronic transactions and document notarization/certification and using electronic signatures via private mailbox or universal messaging.

BACKGROUND

Conventionally, confirmation of documents or financial transactions by authorized individuals have been guaranteed by signature in the presence of a notary or, e.g., a vendor at a point of sale transaction. Further, some transactions are explicitly authorized and confirmed provided that a prior authentication process has been satisfied. Such authentication processes include, for example, password authentication (ATM, Debit card, phone banking) or checking an individual's signature against the signature on a credit card in the possession of the individual after authorization (or at least in case of dispute of a credit card payment).

In the case of remote electronic transactions over the telephone or the Internet, an individual can provide credit card information to a secure server using, e.g., DTMF (Dual Tone Multi-Frequency) communication, voice dialogs with either a machine, e.g., IVR (Interactive Voice Response) or human operators, and/or GUI (graphical user interface) form filling (password/PIN, login). With such remote transactions, however, the individual's signature is not provided, which may place some or all of the financial risk of a fraudulent transaction on the merchant or credit card provider when the authorized user disputes and successfully reverses the charges.

The expansion of online and other electronic transactions has amplified the requirements for more efficient payment authentication procedures. To provide security for remote transactions, various protocols have been utilized using digital certificates to provide digital authentication and signature mechanisms. These protocols can be combined with encryption schemes (e.g., public key and private key) and watermarking.

For example, SET is a protocol that was developed to ensure the security of remote financial transactions over the Internet, for example. Using SET, a financial transaction can be conducted and verified between a consumer, and vendor, and the consumer's service provider or banking institution using both digital certificate and digital signature technology.

More particularly, according to the SET protocol, the banking institution or third-party service provider of the consumer will issue digital certificates to the consumer and the vendor. The digital certificates, in general, may contain information such as the name of the person to whom it was issued, a serial number, an expiration date, a public key, and/or the digital signature of the issuing authority (e.g., the consumer's banking institution/service provider). For processing a remote financial transaction, the client device of the consumer must be running a local program that is capable of encrypting and processing all the information exchanged with the vendor. The vendor must first provide all the transaction information and then provide the digital certificate to the consumer so that the consumer can verify/authenticate the vendor. The vendor authentication process may also be performed by the consumer's bank or service provider.

Upon vendor authentication, the consumer will transmit a purchase order to the vendor (which is encrypted with the vendor's public key), as well as an encrypted credit card authorization (which the vendor can not decode). The vendor then forwards this information to the consumer's service provider or banking institution for verification. Upon acceptance from the bank, the vendor receives an authorization notification. The transaction is then performed and an e-receipt is sent to the consumer.

U.S. Pat. No. 6,016,476, entitled "PORTABLE INFORMATION AND TRANSACTION PROCESSING SYSTEM AND METHOD UTILIZING BIOMETRIC AUTHORIZATION AND DIGITAL CERTIFICATE SECURITY", describes another protocol for performing a secure transaction. According to this protocol, periodic server-side authentications are performed on a server, which result into the download of expiring digital certificates to a client device (or software on a PC (personal computer) or other device), the walletpad, that can now contain the credit card information. Upon local authentication (biometric) and valid digital certificate, the credit card information is freed to perform a local (conventional credit card) or online transaction.

As illustrated above, conventional authentication protocols require complex digital certificate processing capabilities that have not yet been widely adopted. Indeed, to use the SET protocol, for example, the vendor must have the infrastructure to process the handshake with the e-wallet (digital certificate) of the consumer, to track the consumer's order, to determine the consumer's banking institution or service provider, and to forward the information to the bank or service provider and wait for the confirmation.

It would be advantageous to have a protocol that provides secure financial transactions without requiring a complex digital exchange as required by conventional protocols such as SET. Accordingly, a protocol that is capable of providing security for remote transaction, but which is compatible with the existing infrastructure, is highly desirable.

SUMMARY OF THE INVENTION

The present invention is directed to systems and methods for providing user-confirmation of an electronic transaction. More specifically, the present invention provides protocols for enabling electronic signatures and confirmation of electronic documents and transactions such as electronic financial transactions and credit card payment. When a consumer has to confirm an authorization of an electronic transaction (e.g., "online" purchase order via credit card, or signing a contract, etc.), the entity requesting such authorization (e.g., merchant, credit card company, etc.) will leave a "notification message" (e.g., voice mail or e-mail) at a predetermined, private electronic mailbox associated with the consumer. The location of the private mailbox is not communicated by the consumer to the merchant or bank during an electronic transaction. Instead, the merchant or bank will contact an e-Notary based on information provided by the consumer (e.g., IP address of the e-Notary, etc.)

The e-Notary comprises a service that provides the location of the consumer's private electronic mailbox where the bank, credit card company, merchant, etc., can send a notification message (or request for electronic signature). When this information is confidential or private, the e-Notary service can forward the notification message to the consumer's private electronic mailbox on behalf of the bank, credit card company, merchant, etc. The consumer can then access the notification message in his/her private mailbox to confirm authorization of an electronic transaction (e.g., confirm payment authorization, sign a document, etc.). The e-Notary may be a service directly provided by the bank, merchant, or other institution seeking confirmation. In another embodiment, the e-Notary may be a service provided by a third-party with whom the consumer registers. The private electronic mailbox may comprise any suitable messaging system such as an e-mail, SMS (short messaging), MMS (multimedia messaging), instant messaging, voice mail, or universal messaging system (which integrally combines e-mail and voice mail, for example) or any other messaging/communication mechanism.

To confirm authorization of an electronic transaction and/or effectively sign a document, the consumer can access the notification message and send a "reply message" (the consumer secretly knows the location of the notification message and method for replying). The original electronic transaction (associated with the notification message) is deemed confirmed or signed when the requesting entity (bank, merchant) receives a valid reply to the notification message. In other words, in accordance with the present invention, the "reply message" is equivalent to an electronic signature, wherein the electronic signature is authenticated by virtue of the use of the electronic private mailbox and/or other optional authentication procedures such as password, keys, biometrics, etc. that may employed for accessing the private mailbox. It is also possible to add other signature to the reply message (including encryption keys or digital certificates).

In other embodiments of the present invention, protocols are provided for enabling document signing/notarization, as well as document logging and certification.

More specifically, in one aspect of the present invention, a method for confirming an electronic transaction comprises the steps of:

performing an electronic transaction between a first party and a second party;

sending, by the second party, a request for confirmation of the electronic transaction to a predetermined, private mailbox associated with the first party;

accessing the private mailbox by the first party; and sending, by the first party, a reply message to the request for confirmation to thereby confirm authorization of the electronic transaction.

In another aspect of the present invention, a method for confirming an electronic transaction comprises the steps of:

performing an electronic transaction between a first party and a second party;

providing, by the first party to the second party, contact information of a third party service provider associated with the first party;

providing, by the second party to the third-party service provider, a request for confirmation of the electronic transaction;

sending, by the third party service provider, the request for confirmation of the electronic transaction to a predetermined, private mailbox associated with the first party;

accessing the private mailbox by the first party; and sending, by the first party to the third-party service provider, a reply message to the request for confirmation to thereby confirm authorization of the electronic transaction.

In yet another aspect of the present invention, a method for confirming an electronic transaction comprises the steps of:

performing an electronic transaction between a first party and a second party; and sending, by the second party, a confirmation message of the electronic transaction to a predetermined, private mailbox associated with the first party;

wherein the electronic confirmation is deemed confirmed if a reply message denying the transaction is not sent by the first party within a predetermined period of time.

In another aspect of the present invention, a method for confirming an electronic transaction comprises the steps of:

performing an electronic transaction between a first party and a second party, wherein the electronic transaction requires signing a document;

performing a secure functions computation of an electronic copy of the document and storing the results of the computation;

sending, by the second party, an electronic copy of the document and information to perform the secure functions computation to a predetermined, private mailbox associated with the first party;

accessing the private mailbox by the first party and performing the secure functions computation of the electronic document;

sending, by the first party, results of the secure functions computation to the second party; and confirming, by the second party, the electronic transaction if the returned results match the stored results.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

Figure 1:
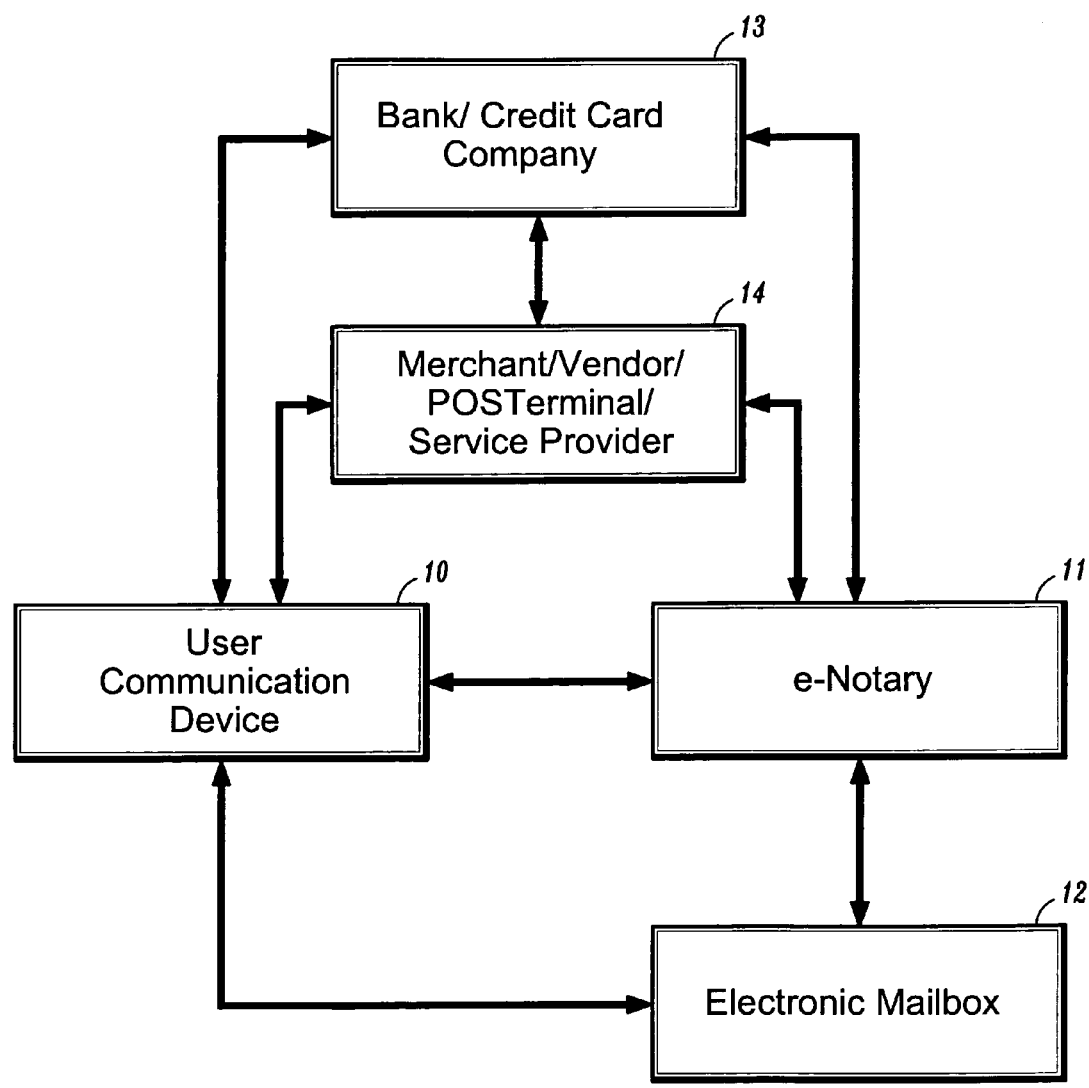
FIG. 1 is a block diagram of a system for enabling confirmation of an electronic transaction using an electronic signature according to an embodiment of the present invention.

Referring now to FIG. 1, a block diagram illustrates a system for enabling user confirmation of an electronic transaction using an electronic signature according to an embodiment of the present invention. It is to be understood that the term "electronic transaction" used herein broadly refers to any form of electronic transaction including, but not limited to, online transactions (e.g., e-business, m-commerce, purchase over the web etc.), POS (point of sale) credit card transactions, EFT (electronic fund transfer) transactions, vending machine transactions, telephone transactions, document notarization, document certification, etc. The system of FIG. 1 comprises a communication device 10 for establishing communication with any one of a plurality of servers associated with an e-Notary 11, private electronic mailbox 12, bank or credit card company 13 and merchant/Vendor/POS terminal 14 or other service provider. It is to be understood that the communication device 10 may be any device such as a portable/wireless communication device (e.g., a WAP (wireless application protocol)-enabled mobile phone or PDA (personal digital assistant)), a PC (personal computer), a conventional telephone, pager, etc.

Generally, in accordance with one aspect of the present invention, when a consumer is requested to confirm the authorization of an electronic transaction (e.g., "online" purchase order via credit card, or signing a contract, etc.), the entity requesting authorization (e.g., merchant, credit card company, etc.) will leave a "notification message" (e.g., voice mail or e-mail) at the private electronic mailbox 12 associated with the consumer. The location of the private mailbox 12 is not communicated by the consumer to the merchant or bank during an electronic transaction. Instead, the merchant or bank will contact the e-Notary 11 based on information provided by the consumer (e.g., IP address of the e-Notary, etc.)

The e-Notary 11 comprises a service that provides a location of the consumer's private electronic mailbox where the bank, credit card company, merchant, etc., can send a notification message (request for electronic signature) and where the consumer can access the notification message to confirm authorization of an electronic transaction (e.g., confirm payment authorization, sign a document, etc.) In another preferred embodiment, the e-Notary service can forward the notification message to the consumer's private electronic mailbox on behalf of the bank, credit card company, merchant, etc.

The private electronic mailbox 12 may comprise any suitable messaging system such as an e-mail, SMS, MMS, instant message, voice mail, universal messaging system (which integrally combines e-mail and voice mail, for example), or any other messaging communication mechanism. For instance, although not preferred, notification messages may be sent using a conventional (snail) mail approach with letters sent to PO Box. The principles of the invention would still apply assuming there is an appropriate use for this type of communication. In addition, fax exchanges may be used for communication of notification and reply messages. In these examples, the invention adds another level of security in addition to a physical signature.

To confirm authorization of an electronic transaction and/or effectively sign a document, the consumer will access the notification message and send a "reply message". The reply message may comprise any form of message that refers or relates to the confirmation message. For instance, the reply message may comprise a forward message to another address or a new message with an appropriate reference number. The original electronic transaction (associated with the notification message) is deemed confirmed or signed when the requesting entity (bank, merchant) receives a valid reply to the notification message. In other words, in accordance with the present invention, the "reply message" (or other related message) is equivalent to an electronic signature, wherein the electronic signature may be authenticated using one or more security protocols described below. Preferred methods for providing consumer confirmation of an electronic transaction will be described in greater detail below with reference to FIGS. 2 and 3.

It is to be appreciated that the e-Notary service may be provided by one or more entities. For instance, in one embodiment, the e-Notary service 11 may be a service directly provided by each service (e.g., bank, credit card company, merchant, etc.), that requires confirmation of a consumer authorized electronic transaction. In this embodiment, the consumer would possible have a different private mailbox for each service provider.

In another embodiment, the e-Notary service may be provided by a third party. Preferably, the consumer would register with the third-party e-Notary service and use such service for all or most of the consumer's electronic transactions. The e-Notary would open an account and assign an identification number to the consumer. The consumer and e-Notary would agree on the location of the user's private electronic mailbox or other location where the consumer would go to authenticate an electronic transaction (i.e., send a reply message (or other related message) in response to a request for confirmation). The consumer and e-Notary may also agree on the method by which the e-Notary would notify the consumer when a request for confirmation has been received and placed in the consumer's private mailbox. For example, the communication device 10 of the consumer could be a pager or mobile phone, instant messaging, SMS, etc., for receiving notification from the e-Notary.

Accordingly, when a merchant or bank wants to authenticate/confirm a transaction (e.g., obtain a signature for a document), the consumer would provide the name or contact information of the consumer's e-Notary to the merchant or bank. Then, based on the consumer's name or identification, for example, the third-party e-Notary would route the confirmation request to the appropriate mailbox, thereby allowing the consumer to reply and, thereby, effectively confirm the transaction authorization.

It is to be appreciated that the present invention can provide various levels of authentication for a consumer confirmation of an electronic transaction. For instance, on one level, authentication of reply message is provided by virtue of the use of the private mailbox and knowledge and explicit action of the consumer. Indeed, it is difficult for unauthorized individuals to confirm a fraudulent authorization because the location of the consumer's private electronic mailbox is not communicated or agreed to during an electronic transaction and because only the authorized consumer will know the location of his/her private electronic mailbox (e.g. phone number, e-mail account/server) to access and provide confirmation.

In addition, because the consumer may be given prior notification at a predetermined address (e.g., via phone, pager, e-mail, letter, etc.) by the e-Notary of a pending request for confirmation in the private mailbox, only the authorized user will have knowledge of a pending confirmation request. Thus, the use of the private mailbox may be viewed as being analogous to, e.g., a PIN for a bank account, but without requiring the PIN to be entered during interaction with the bank or having to communicate the PIN across a network (e.g., phone/PSTN, wireless, Internet, etc.) to the Bank during the transaction.

Indeed, further security may be obtained by imposing a time period in which a confirmation may be provided by the consumer and/or requiring the use of a key provided by the entity seeking confirmation at the time of either the electronic transaction or notification by the e-Notary. Further, conventional authentication methods can be used when entering in the transaction, retrieving the confirmation request, confirming, etc.

It is to be further appreciated that additional levels of security may be employed to ensure authentication of a consumer confirmation. For example, conventional (code/password) or biometric authentication protocols (speaker recognition) may be implemented to access the private mailbox and/or send a valid reply message to the entity requesting confirmation. Preferably, the access control protocols described in U.S. Pat. No. 5,897,616, issued Apr. 27, 1999 to Kanevsky et al., entitled "Apparatus and Methods For Speaker Verification/Identification/Classification Employing Non-Acoustic and/or Acuostic Models and Databases", may be implemented herein to provide secure access to the private mailbox server and/or bank server. U.S. Pat. No. 5,897,616, which is incorporated herein by reference, describes biometric authentication protocols that utilize, e.g., a combination of speech recognition, text-independent speaker recognition and/or natural language understanding using acoustic and non-acoustic models and random questions) to provide security from unauthorized access to a central server. It is to be understood, however that any suitable authentication procedure may be utilized (such as those based on biometrics, passwords, challenge response, smart card, digital certificate, encryption key, etc.)

In another embodiment, encryption, digital certificate, error correction code and watermarking methods can be used to guarantee integrity of the electronic signature (reply message) as well as the associated notification message that is sent to the private mailbox for confirmation.

Advantageously, the present invention is well-suited for payment by phone, wherein in the near future it is expected that e-business transactions will expand to wireless phones and other mobile Internet appliances. The present invention is also a key component to online transactions, especially when such transactions go beyond credit card payment to encompass signature of contracts and agreements, etc. (as opposed to using snail mail).

Furthermore, the present invention may be implemented with any suitable purchase information exchange protocol to provide secure financial transactions. For example, the protocols described herein may be implemented with the payment protocols described in U.S. patent application Ser. No. 09/417,645, filed on Oct. 14, 1999, entitled "System and Method for Providing Secure Financial Transactions," which is commonly assigned and incorporated herein by reference. This application describes various protocols wherein the consumer contacts his/her bank with information about the merchant and transaction in order to authorize the transaction (based on biometric, digital certificate and/or other authentication mechanisms). The bank contacts the merchant's bank (and a possible escrow) and confirm payment upon which the transaction is completed either by informing the merchant or by providing a confirmation code to the consumer that the consumer could provide, in turn, to the merchant or vending machine. The protocols described herein may be further implemented by the consumer's bank to authenticate the consumer's order prior to confirming to the merchant's bank.

Moreover, the present invention may be extended with the SET protocol to provide authentication in addition to authenticating on the basis of the digital certificate. Alternatively, the merchant could use the protocols of the present invention prior to engaging in a SET transaction.

Numerous other combinations involving different usage scenarios for the notification and confirmation should be considered as covered by the teachings of the present invention.

Figure 2:
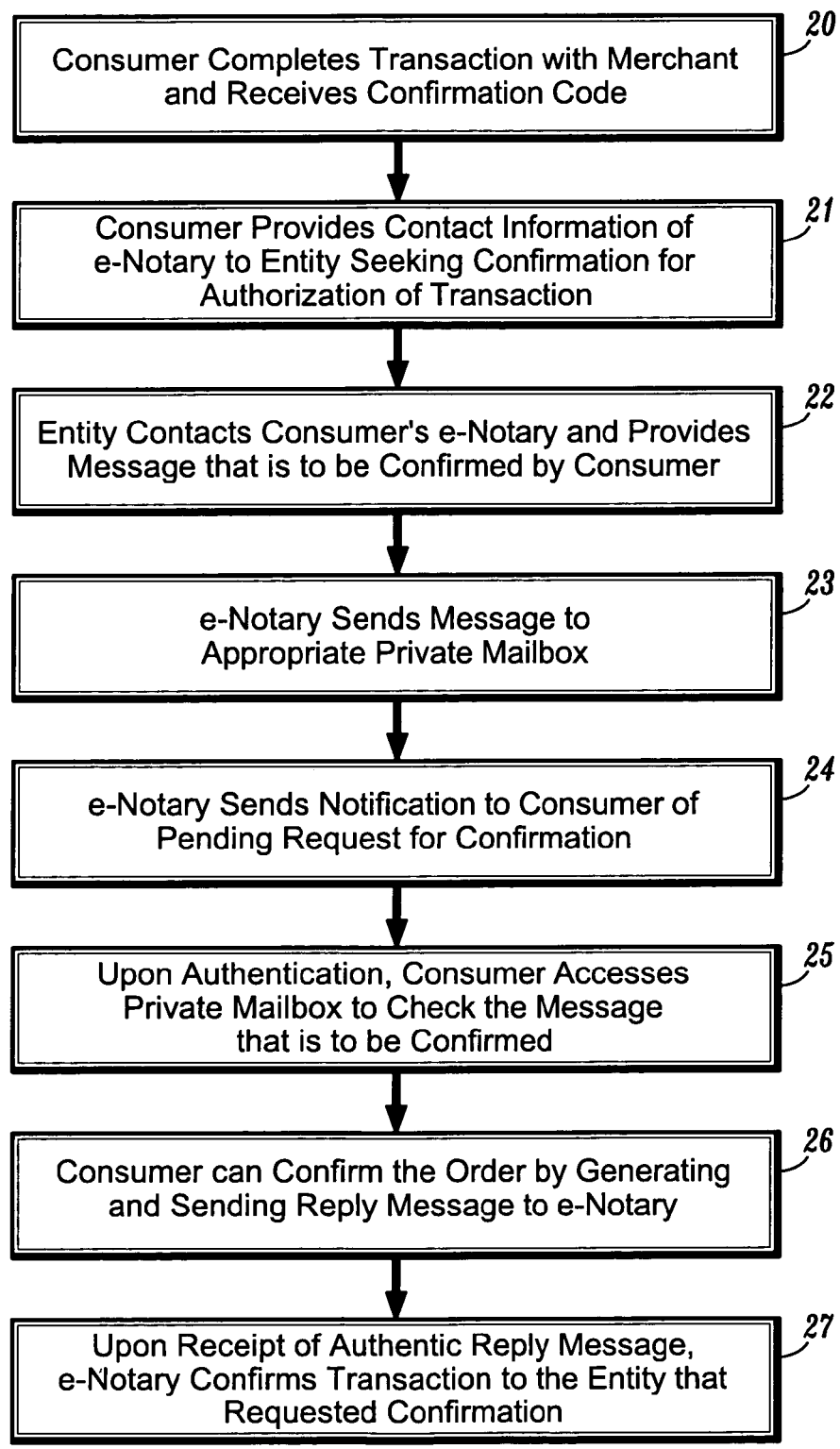
FIG. 2 is a flow diagram of a method for confirming an electronic transaction according to one aspect of the present invention.

Referring now to FIG. 2, a flow diagram illustrates a method for confirming an electronic transaction according to one aspect of the present invention. In particular, the method of FIG. 2 describes a preferred method for confirming an electronic transaction comprising a purchase order or request for a product or service. Initially, a consumer will commence and complete a purchase order transaction with a merchant and then receive a confirmation code for the transaction (step 20). For instance, the transaction may comprise the purchase of a product either online or via telephone, whereby the consumer provides credit card information to a merchant. This transaction process may comprise any transaction protocol.

Next, the consumer will provide the contact information (e.g., name, URL, etc.) of his/her e-Notary service to the entity seeking confirmation of the transaction (step 21) For instance, the entity may be the consumer's credit card company seeking confirmation of the order prior to transferring funds to the merchant's account. This last step is not required when the entity seeking confirmation of the transaction also provides the e-notarization service.

Using the e-Notary information, the entity seeking confirmation contacts the consumer's e-notary service and provides the e-notary with a message (request for confirmation) that is to be confirmed by the consumer (step 22). This message may comprise information such as the date, price, and nature of the transaction, any reference information associated with the transaction, the consumer's account information (e.g., a credit card number, expiration date etc.), the name of the recipient merchant, etc. The e-notary service may add information such as reference information about the transaction to be authorized, additional integrity information, possibly account involved, a confirmation code that, for example, the consumer would have to provide in the confirmation message, etc.

Then, based on the consumer's registration information (e.g., identification number, etc.), the e-notary will send the message to be confirmed (possibly encrypted and with integrity protection) to the consumer's predetermined, private mailbox location (e.g., voice mail, e-mail, universal messaging server, etc.) (step 23). Again, these steps are performed without revealing the location of the mailbox or the confirmation code or other information that the consumer provides in the reply (or equivalent message) to confirm the authorization.

Optionally, the e-Notary may provide prior notification to the consumer at another predetermined location (e.g., cell phone number, e-mail account, pager, etc.) of the pending request for confirmation of the transaction (step 24). The prior notification message comprises information regarding the message to be confirmed by the consumer and optionally a notification code that the user may have to use to retrieve the message to be confirmed. Essentially, the prior notification informs the user that some transaction has taken place that needs to be confirmed and provides information regarding the transaction. This notification enables a user to detect whether some unauthorized individual is attempting to use the consumer's account to commit a fraudulent transaction. The notification message may also specify a time period in which the consumer is required to retrieve the message and confirm the transaction (where the expiration of the time period without an appropriate confirmation would result in the transaction being deemed void).

Then, to confirm the transaction, the consumer will access his/her private mailbox to check the transaction information that is to be confirmed (step 25). This process may or may not require user authentication using access control protocols as discussed above (such as the protocols described in the above-incorporated U.S. Pat. No. 5,897,616 and/or other conventional methods).

The consumer can then sign/confirm the transaction by generating a reply message (or any other message) that comprises, for example, the confirmation code (step 26), which reply message is then sent to the consumer's e-Notary (or any predetermined address). It is to be understood that the reply may comprise a fax, message, voice call to an IVR, operator, voice message, etc. Preferably (but not mandatory), the notification as well as the confirmation are integrity protected using any suitable technique such as encryption, digital certificates or watermarking. Upon receipt of an authenticated reply message (any message with the confirmation code from the appropriate address), the e-Notary can then confirm the transaction to the merchant or other party that was seeking confirmation of the transaction.

It is to be understood that in another embodiment, the user confirmation may not be mandatory. For example, it is possible that the e-notary service only sends notification along with a message specifying that the transaction will be deemed confirmed if the user does not deny the message within a give time frame. This approach may be suitable for certain applications.

In addition, authentication on the mailbox is optional but preferred. Further, notification to the user is an optional step for transaction confirmation since the consumer is presumably aware that he/she will have to confirm the transaction to complete the transaction. This is especially true if the system is automated and can deliver almost instant messages to the consumer's private mailbox after completion of the order.

Figure 3:
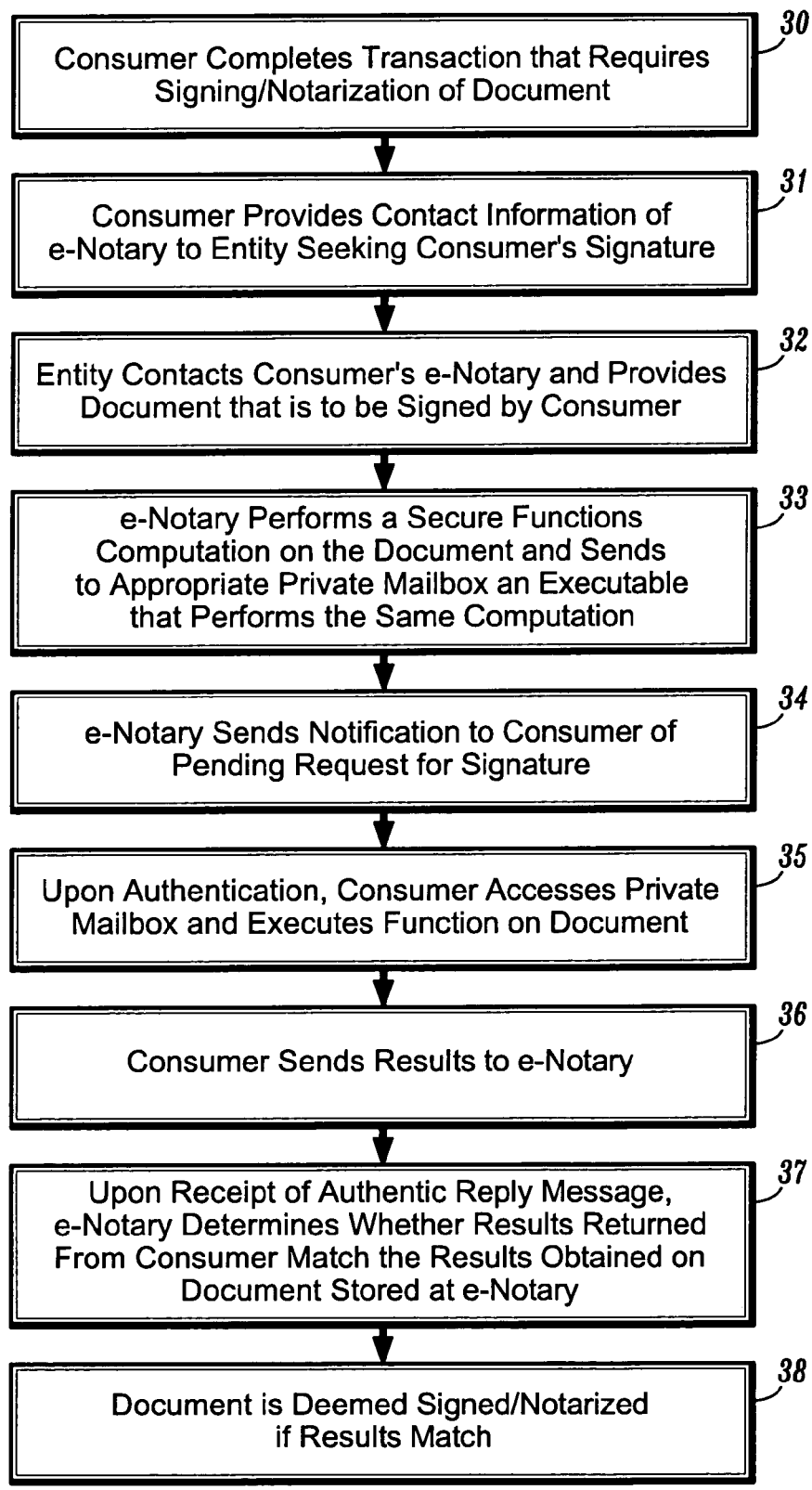
FIG. 3 is a flow diagram of a method for confirming an electronic transaction according to another aspect of the present invention.

FIG. 3 is a flow diagram illustrating a method for confirming an electronic transaction according to another aspect of the present invention. In particular, FIG. 3 illustrates a method for electronically signing and notarizing an electronic document (in contrast to a conventional method of physically signing a contract established with a vendor, for example). Initially, a consumer will commence and complete a transaction that requires the consumer's signature/notarization of a document (step 30). For instance, the consumer may have opened a trading account with a broker requiring the consumer's signature on a contractual document.

Next, the consumer will provide the contact information (e.g., name, URL, etc.) of his/her e-Notary service to the entity seeking the consumer's signature (step 31). This step is not required when the entity seeking the consumer's signature on the document provides the e-notarization service. Using the e-Notary information, the entity contacts the consumer's e-notary service and provides the e-notary with the document that is to be signed by the consumer (step 32). Then, based on the consumer's registration information (e.g., identification number, etc.), the e-notary will perform a set of secure functions computation on the document, store the results of the computation, and then send to the consumer's predetermined, private mailbox location, an executable file that performs the same computation (step 33) or parameters of an agreed upon executable. It is to be understood that the secure functions computation may comprise any suitable function. For example, one function may compute the number of vowels and letter "r" in the document. In practice, more complex, reliable, suitable and secure functions may be randomly built. Preferably, it is the responsibility of the e-notary to decide how many such functions/results should be compiled. This approach may include encryption/encoding of the entire document with special keys and decoding/matching at the other end.

Optionally, the e-Notary may notify the user at another predetermined location (e.g., cell phone number, e-mail account, pager, etc.) of the pending request for signature of the document (step 34).

Then, to sign the document, the consumer will contact his/her private mailbox to access the executable file (or the parameters of an agreed upon executable), and then execute the secure functions computation on the electronic document within the possession of the consumer (step 35). Again, this process may or may not require user authentication. Preferably, user authentication is employed using any suitable access control protocol such as the protocols described in the above-incorporated U.S. Pat. No. 5,897,616 or any other conventional method.

The consumer will then send the results of the computation back to the e-Notary (step 36) (which results can be a vector or matrix), along with the confirmation code as discussed above. The result may be as complex as an encrypted version of the document computed by the executable. Upon receipt of an authenticated reply message, the e-Notary determines whether the results returned by the consumer in the reply message match the stored results obtained on the same document by the e-Notary (step 37). The document will be deemed signed and notarized if the results match (step 38).

It is to be appreciated that any suitable document integrity checking mechanism can be used, especially if it involves a large set of possible mechanisms that can be distributed/defined by the e-Notary during notification or in the mail sent to the private mailbox of the consumer.

It is to be further appreciated that if the document is not originally in electronic format, the same function can be achieved, for example, by creating a set of questions about the document that the user must answer when replying.

Besides the fact that secure communications (SSL, encryption, etc.) can be used to communicate the documents, an electronic document can be encrypted such that the e-Notary does not have to open and/or decrypt the electronic document to be signed/notarized. In this case, the secure functions computation would directly act on the encrypted binary version of the document.

It is to be appreciated that in addition to providing a full notary business opportunity, the present invention provides another application and business model—document logging and certification. Multiple variations of this paradigm exist. For example, assume that a consumer wants to log a given document as being produced as such on a given day (e.g., a will in electronic format, a scientific paper/draft, a laboratory memo, an invention description, etc.). The consumer could send the document (securely or not) to the e-Notary and then receive a reply in his/her private mailbox. If the document is to be signed, the consumer would preferably proceed as described above (FIG. 3). In addition, the consumer could maintain a copy of the message received in his/her private mailbox and/or forward the message to his/her main e-mail address from the private mailbox. When the consumer needs to obtain certification that a given document existed in e-Notary's files, he/she can request the e-Notary to send a new notice to his/her private mailbox, by sending a reply to the previous older message. The e-Notary will then generate a new integrity check function and ask the consumer to answer and indicate the location to where the e-Notary should send certification. Upon integrity check, the e-Notary will certify the existence and integrity of the document bearing the user signature and dated (date when the user originally sent and signed) and if needed send copy of the certified document.

It is to be further appreciated that the present invention provides a business model for the e-Notary. Indeed, the e-Notary may obtain revenue from one or any combination of the following: (i) subscription fee from users; (ii) subscription fee from merchants; and/or (iii) percentage on the signed deals or flat fee/usage based.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for confirming an electronic transaction, comprising the steps of:
   performing an electronic transaction between a first party and a second party;
   providing, by the first party to the second party, contact information of a third party service provider associated with the first party;
   contacting, by the second party, the third party service provider to obtain a location of a predetermined, private mailbox associated with the first party;
   sending, by the second party, a request for confirmation of the electronic transaction to the predetermined, private mailbox associated with the first party;
   accessing the private mailbox by the first party; and
   sending, by the first party, a reply message to the request for confirmation to thereby confirm authorization of the electronic transaction,
   wherein information regarding the private mailbox is not communicated to the second party during the electronic transaction.

2. The method of claim 1, further comprising the step of sending notification to the first party of a pending request for confirmation.

3. The method of claim 2, wherein the notification comprises a confirmation code to be provided in the reply message.

4. The method of claim 2, wherein the step of sending notification comprises sending a notification message by the second party to a predetermined messaging location of the first party other than the private mailbox of the first party.

5. The method of claim 1, wherein the step of sending a reply message comprises sending an e-mail message to a predetermined location.

6. The method of claim 5, wherein the e-mail message comprises a confirmation code provided in the notification message.

7. The method of claim 1, wherein the step of sending a reply message comprises forwarding the confirmation message to a predetermined location.

8. The method of claim 1, further comprising the step of imposing a time period in which the first party must confirm authorization of the electronic transaction.

9. The method of claim 8, further comprising confirming the electronic transaction if the first party does not confirm authorization of the electronic transaction within the predetermined period of time.

10. The method of claim 8, further comprising voiding the electronic transaction if the first party does not confirm authorization of the electronic transaction within the predetermined period of time.

11. The method of claim 1, wherein the step of accessing the private mailbox comprises authenticating the identity of the first party to access the private mailbox.

12. The method of claim 11, wherein the step of authenticating the identity of the first party comprises performing biometric authentication of the first party.

13. The method of claim 11, wherein the step of authenticating the identity of the first party comprises providing a predetermined PIN (personal identification number) or password of the first party.

14. The method of claim 1, further comprising the step of encoding the confirmation request and reply message.

15. The method of claim 1, wherein the private mailbox comprises a messaging system.

16. The method of claim 15, wherein the messaging system comprises one of an e-mail, short messaging, multimedia messaging, instant messaging, voice mail, and universal messaging system.

17. The method of claim 1, wherein the private mailbox comprises a post office box and the confirmation is sent via snail mail.

18. The method of claim 1, wherein the private mailbox comprises a facsimile number and the confirmation message comprises a facsimile message.

19. A method for confirming an electronic transaction, comprising the steps of:
   performing an electronic transaction between a first party and a second party;
   providing, by the first party to the second party, contact information of a third party service provider associated with the first party;
   providing, by the second party to the third-party service provider, a request for confirmation of the electronic transaction;
   sending, by the third party service provider, the request for confirmation of the electronic transaction to a predetermined, private mailbox associated with the first party;
   accessing the private mailbox by the first party; and
   sending, by the first party to the third-party service provider, a reply message to the request for confirmation to thereby confirm authorization of the electronic transaction,
   wherein information regarding the private mailbox is not communicated to the second party during the electronic transaction.

20. The method of claim 19, further comprising the step of sending, by the third party service provider, notification to the first party of a pending request for confirmation.

21. The method of claim 20, wherein the step of notifying comprises sending a notification message to a predetermined messaging location of the first party other than the private mailbox of the first party.

22. The method of claim 19, further comprising the step of imposing a time period in which the first party must confirm authorization of the electronic transaction.

23. The method of claim 22, further comprising confirming the electronic transaction if the first party does not confirm authorization of the electronic transaction within the predetermined period of time.

24. The method of claim 22, further comprising voiding the electronic transaction if the first party does not confirm authorization of the electronic transaction within the predetermined period of time.

25. The method of claim 19, wherein the step of accessing the private mailbox comprises authenticating the identity of the first party to access the private mailbox.

26. The method of claim 19, further comprising the step of encoding the confirmation request and reply message.

27. The method of claim 19, wherein the second party and third party service provider are the same entity.

* * * * *